US008573979B2

(12) United States Patent
Skinner

(10) Patent No.: US 8,573,979 B2
(45) Date of Patent: Nov. 5, 2013

(54) TACTILE DISPLAY TO ALLOW SIGHT IMPAIRED TO FEEL VISUAL INFORMATION INCLUDING COLOR

(75) Inventor: Michael Skinner, San Jose, CA (US)

(73) Assignee: Intel-GE Care Innovations LLC, Roseville, CA (US)

(*) Notice: Subject to any disclaimer, the term of this patent is extended or adjusted under 35 U.S.C. 154(b) by 1227 days.

(21) Appl. No.: 11/944,065

(22) Filed: Nov. 21, 2007

(65) Prior Publication Data

US 2009/0130639 A1 May 21, 2009

(51) Int. Cl.
*G09B 21/00* (2006.01)

(52) U.S. Cl.
USPC .......................... 434/114; 434/112; 434/113

(58) Field of Classification Search
USPC .......................... 434/112–115, 117
See application file for complete search history.

(56) References Cited

U.S. PATENT DOCUMENTS 3,250,023 A * 5/1966 Benson .......................... 434/114
5,073,959 A * 12/1991 Sugiura et al. .................. 382/266
5,293,464 A 3/1994 Hirano
5,912,660 A * 6/1999 Gouzman et al. ............. 345/163
6,625,088 B1 9/2003 Mah
6,705,868 B1 * 3/2004 Schleppenbach et al. .... 434/114
7,009,595 B2 3/2006 Roberts
2002/0158836 A1 10/2002 Ishmael
2003/0117371 A1 6/2003 Roberts
2003/0169452 A1 * 9/2003 Engbrocks .................. 358/1.18
2004/0136571 A1 7/2004 Hewitson
2005/0037322 A1 * 2/2005 Kaul ............................ 434/185
2005/0272012 A1 * 12/2005 Logan et al. .................. 434/112

* cited by examiner

*Primary Examiner* — Xuan Thai
*Assistant Examiner* — Jerry-Daryl Fletcher
(74) *Attorney, Agent, or Firm* — Pillsbury Winthrop Shaw Pittman LLP

(57) ABSTRACT

A tactile display may comprise an array of pins that may be raised in height relative to one another to represent contours of objects in a graphic image or picture when touched. Various physical attributes may be given to individual pins to represent color or brightness. For example, pins may be heated or cooled to represent cool or warm colors in the original image. Pins may also be vibrated or otherwise enhanced to represent color or brightness information in the original image.

7 Claims, 3 Drawing Sheets

TACTILE DISPLAY TO ALLOW SIGHT IMPAIRED TO FEEL VISUAL INFORMATION INCLUDING COLOR

FIELD OF THE INVENTION

Embodiments of the present invention, relate to tactile displays and, more particularly, to tactile displays which may display visual information including color representation.

BACKGROUND INFORMATION

Pin art matrix devices have been popular as toys and as art for a number of years. FIG. 1 shows a typical pin art matrix device. The device takes a three-dimensional relief of a surface by using a crowded array of pins 2 that are free to slide back and forth independently. The three dimensional object, such as a human hand, is pressed into the under side of the matrix 4 and the pins 2 traverse upwards proportional to the contours of the object. The object is then displayed on the top side 6 of the matrix as a combination of pins all at various heights.

Tactile displays for the sight impaired have also been around for a number of years which take advantage of pin matrix devices. Typically the matrix is fairly small and actuators raise a series of pins to a same height to represent a braille character which may be read by touching a finger to the matrix. Each braille character or cell is made up of six dot positions, arranged in a rectangle matrix containing two columns of three dots each. A dot may be raised at any of the six positions to form sixty-four combinations, including the combination in which no dots are raised.

More recently devices have been developed for translating visual images into tactile images. For example, U.S. published patent application 2002/0158836 to Ishmael, Jr. et al., describes an imaging device for converting incident light from a visual image into electrical signals that are proportional to the gray scale intensity of the incident light. A tactile display device has a two-dimensional array of variable height pixels, wherein the height of each pixel in the tactile display is dynamically variable in proportion to the electrical signals.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Figure 1:
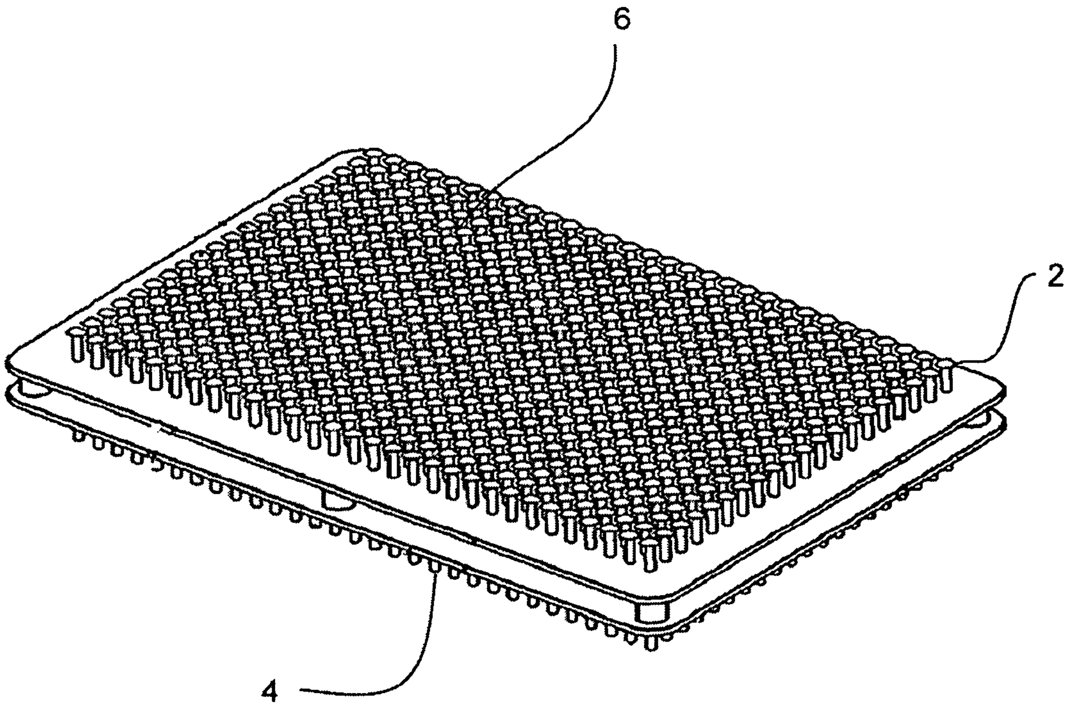
FIG. 1 is a perspective view of one example of a tactile display.

In the following detailed description, like reference numerals and characters may be used to designate identical, corresponding or similar components in differing FIG. drawings.

Well-known power/ground connections to integrated circuits (ICs) and other components may not be shown within the figures for simplicity of illustration and discussion. Where specific details are set forth in order to describe example embodiments of the invention, it should be apparent to one skilled in the art that the invention can be practiced without these specific details.

Figure 2:
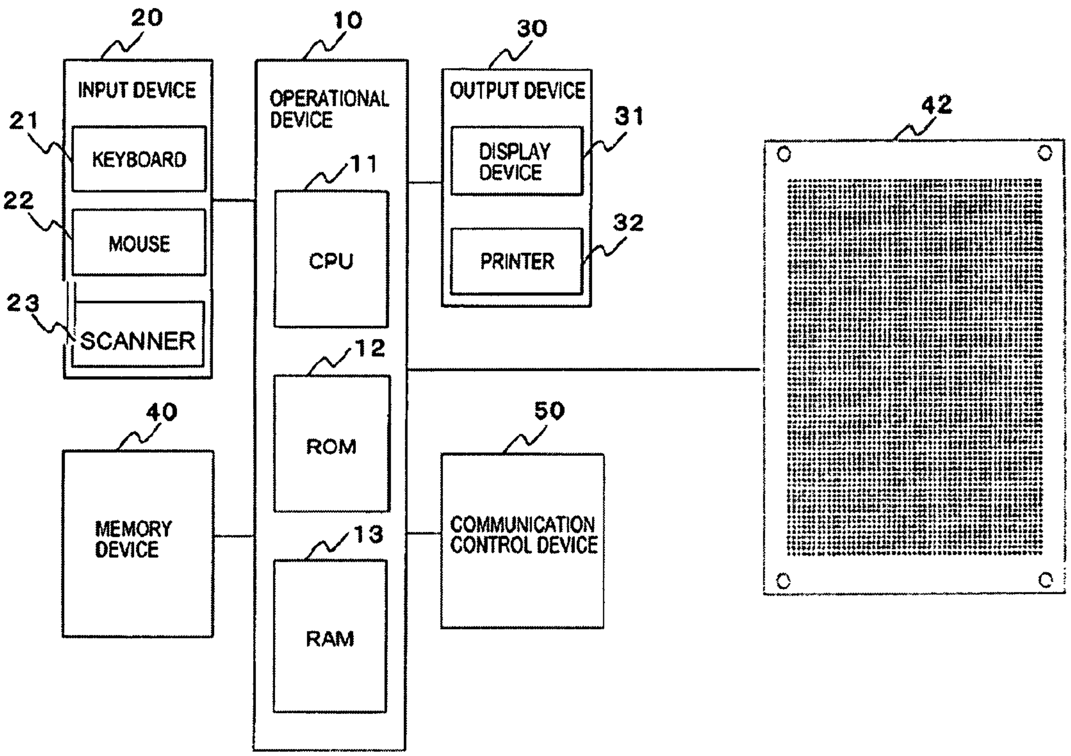
FIG. 2 is a block diagram of a system to construct a tactile display according to an embodiment.

FIG. 2 shows an example of a construction of a hardware system, which can be used to construct a tactile display according to the present invention. A generic computer system is shown in FIG. 2. That is, the hardware system shown in FIG. 2 has an operational device 10, an input device 20 having a keyboard 21, a mouse 22, and a scanner 23, an output device 30 having a display device 31, such as a color monitor, and a printer 32, a memory device 40 including a hard disk device and so on, and a communication control device 50 for connecting to networks. Here, the input device 20 and the output device 30 are both generic terms. Accordingly, for example, the output device 30 does not have to be a device having the display device 31 and the printer 32. Further, according to embodiments, a tactile pin matrix display 42 may also be operated by the operational device 10.

The operational device 10 has a central processing unit (CPU) 11, a read only memory (ROM) 12 and a random access memory (RAM) 13. The CPU 11 loads application programs into the RAM 13 and executes the same installed in the memory device 40 in order to perform processing of different kinds of applications. One of the application programs may be a program to digitize an image, such as a picture or graphic used in this embodiment. The program may be provided by a recording medium such as CD-ROM and a flexible disk. Further, the program may be obtained by downloading it from a server, which provides programs, over a network or the like. In both cases, it is translated into an executable form and is stored in the memory device 40 according to an embodiment.

A picture or other graphic may be scanned or otherwise available to the operational device 10. The application program running on the operational device 10 may digitize an image or take an already digitized image and perform an edge detect and an image may be created that may be displayed on the pin matrix display 42. Edge detect filter techniques are known and typically search for borders between different colors to detect contours of objects in the graphic. These contours may then be displayed as on the pin matrix display 42 as pins of varying height.

Figure 3:
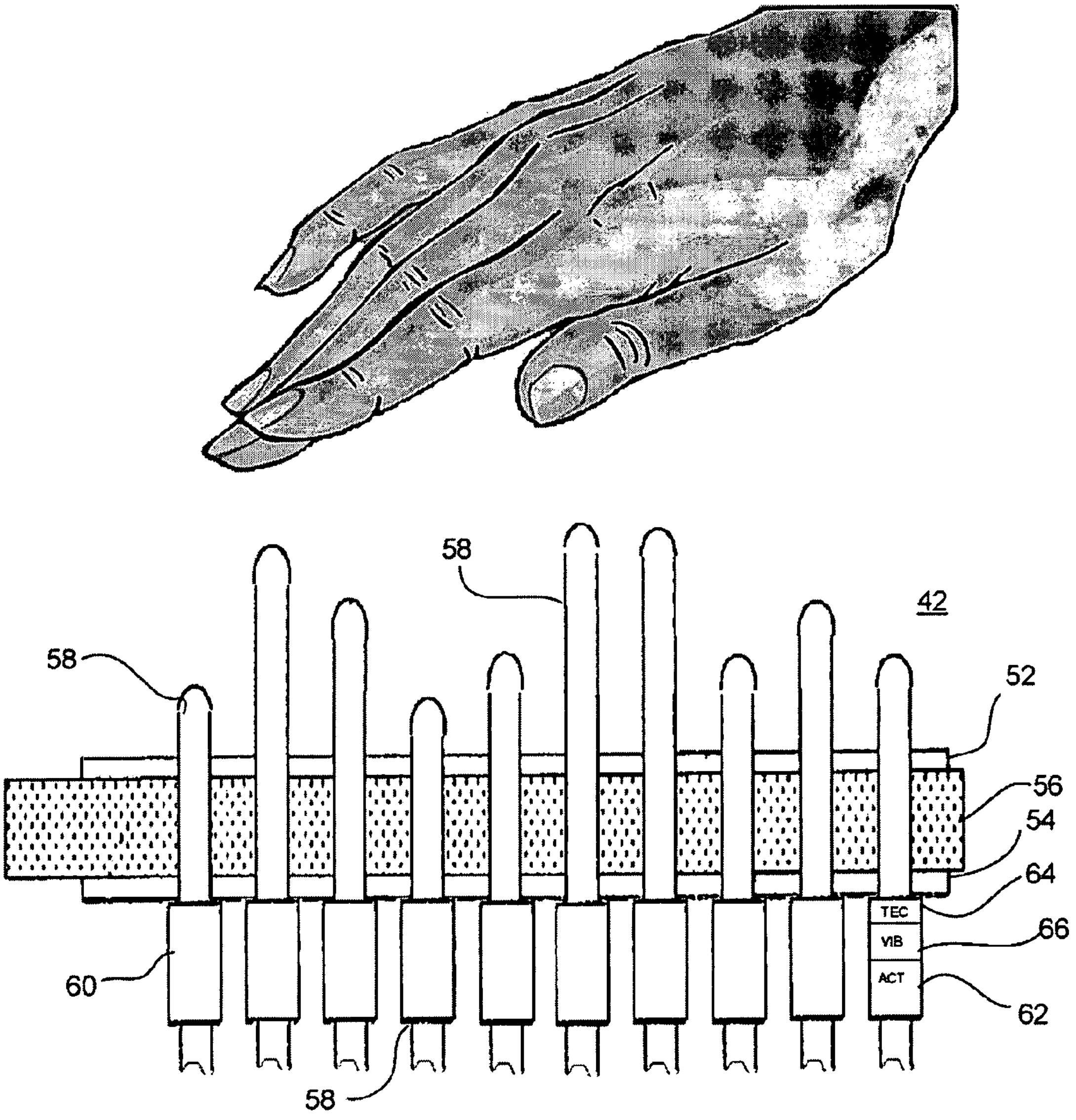
FIG. 3 is a cut away side view of a tactile display according to an embodiment for further conveying color information when touched.

FIG. 3 shows a representative cut-away side view of the pin matrix display 42. A top plate 52 and bottom plate 54 may have a space 56 in between separating the plates. A plurality of holes aligned between the plates, 52 and 54, may be provided to accommodate a plurality of pins 58. Each pin 58 may have associated therewith functional parts 60. In particular, the functional parts may include an actuator 62 for causing the pin to move up and down relative to the plates, 52 and 54 in response to a signal from the operational device 10. The relative heights of the pins 58 being representative of a graphic image when touched, such as by a human hand. This of course may be analogous to a black and white or grey scale image to a sighted person.

In other embodiments, an enhancement might be to give each pin 58 a physical attribute to represent color in the original graphic image. For example, embodiments may vary the relative height proportional to the brightness of an image where the graphic image was converted into black and white.

In other embodiments, color may also be represented such as by heating or cooling areas of the pins to represent or convey color in the image. The functional parts 60 may further include a means to heat and/or cool ones of the pins such as with a thermal electric cooler (TEC) 64.

Colors are often described in terms of "hot and cool" colors as color tends to evoke mood or feeling. For example, at one end of the spectrum cool colors may be comforting. Blue, green, and the neutrals white, gray, and silver are examples of cool colors. Warm colors convey emotions from simple optimism to strong violence. The warmth of red, yellow, pink, or orange can create excitement or even anger. The neutrals of black and brown are also considered of warm colors. Thus, the operational device 10, may signal the TEC 64 to heat or cool ones or areas of pins to relative temperatures according to colors in the graphic image and these temperature variations when felt to the touch may convey some sense of color.

Similarly, in another embodiments, a the pins 58 may have associated therewith a vibration mechanism 66, also controlled by the functional unit 10, to vibrate the pins at relative frequencies in an effort to also convey color of the graphic image on a tactile display 42. Since color is not typically associated with movement or vibrations any convention may be adopted. For example, pins 58 associated with warm colors in the graphic image may vibrate at a higher frequency than cooler colors. In another embodiment, relative amounts of low currents may conduct through the pins 58 to convey color in much the same manor.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A tactile display, comprising:

an array of pins comprising a first pin and a top plate and a bottom plate separated by a space between the top plate and the bottom plate, the top plate having a first hole and the bottom plate having a second hole, the first hole and the second hole aligned with each other, wherein the first pin passes through the first hole and the second hole;

a control device communicatively coupled to the array of pins and configured to receive a colored graphic image and to convert the colored graphic image to a black and white image and to determine brightness values of the black and white image;

a plurality of actuators, each of the plurality of actuators configured to move one of the array of pins to a height relative to other pins in the array, wherein the relative heights are based on the brightness values of the black and white image, wherein one of the plurality of actuators is located under the first pin;

a plurality of vibrating devices, each of the plurality of vibrating devices configured to vibrate one of the array of pins at a frequency associated with a color at a location of the colored graphic image corresponding to the one of the array of pins, wherein one of the plurality of vibrating devices is located under the first pin;

a thermal electric cooler (TEC) configured to heat the first pin when the first pin is representing a warm color at the location of the colored graphic image corresponding to the first pin and to cool the first pin when it is representing a cool color at the location of the colored graphic image corresponding to the first pin; and a current source configured to pass current through the first pin based on the color at the location of the colored graphic image corresponding to the first pin.

2. The tactile display as recited in claim 1, wherein each of the plurality of vibrating devices is adjacent to one of the plurality of actuators.

3. The tactile display as recited in claim 2, wherein each of the plurality of vibrating devices is configured to generate a vibrating frequency that is higher for the warm color than for the cool color, wherein the warm color comprise red, orange, yellow, pink, or a combination thereof, and wherein the cool color comprise green blue, white, silver, gray, or a combination thereof.

4. A method for displaying an image on a tactile display, comprising:

converting, with a control device, a colored graphic image to a black and white image;

determining, with the control device, brightness values of the black and white image;

raising, with an actuator, a first pin of an array of pins through a bottom plate and a top plate of the array of pins to a height relative to other pins in the array, wherein the relative heights are based on the brightness values of the black and white image;

vibrating, with a vibrating device, the first pin, the frequency of vibration based on a color at a location of the colored graphic image corresponding to the first pin;

passing, with a current source, current through the first pin based on the color at the location of the colored graphic image corresponding to the first pin;

heating, with a thermal electric cooler, the first pin if the first pin represents a warm color at the location of the colored graphic image corresponding to the first pin; and cooling, with the thermal electric cooler, the first pin if the first pin represents a cool color at the location of the colored graphic image corresponding to the first pin.

5. The method as recited in claim 4, wherein the vibrating device is adjacent to the actuator.

6. The method as recited in claim 5, wherein the vibrating is done at a frequency that is higher for the warm color than for the cool color, wherein the warm color comprises red, orange, yellow, pink, or a combination thereof, and wherein the cool color comprises green blue, white, silver, gray, or a combination thereof.

7. The method as recited in claim 4, further comprising:

digitizing the colored graphic image; and using an edge detect filter to detect contours of objects in the colored graphic image.

* * * * *